INVENTOR.
Angelo Vaccaro
BY
Johnson and Kline
ATTORNEYS

SYSTEM CODE — SHIFT REGISTER STAGES; APPROVED CODE

| CHARACTER | 10 | 9 | 8 | 7 | 6 | 5 | 4 | 3 | 2 | 1 | APPROVED CODE | | | | | |
|---|---|---|---|---|---|---|---|---|---|---|---|---|---|---|---|---|
| 1 | 1 | 1 | 0 | 1 | 1 | 1 | 1 | 0 | 1 | 0 | 1 | 0 | 0 | 0 | 1 | 0 |
| 2 | 1 | 1 | 1 | 1 | 0 | 1 | 0 | 1 | 1 | 0 | 0 | 1 | 1 | 0 | 0 | 0 |
| 3 | 1 | 1 | 1 | 1 | 0 | 1 | 1 | 0 | 1 | 0 | 1 | 0 | 1 | 0 | 0 | 0 |
| 4 | 1 | 1 | 1 | 0 | 1 | 1 | 1 | 0 | 1 | 0 | 1 | 0 | 0 | 1 | 0 | 0 |
| 5 | 1 | 1 | 0 | 1 | 0 | 1 | 1 | 1 | 1 | 0 | 0 | 0 | 0 | 1 | 1 | 0 |
| 6 | 1 | 1 | 0 | 1 | 1 | 0 | 1 | 1 | 1 | 0 | 0 | 0 | 1 | 0 | 1 | 0 |
| 7 | 1 | 1 | 1 | 1 | 1 | 0 | 1 | 0 | 1 | 0 | 1 | 1 | 0 | 0 | 0 | 0 |
| 8 | 1 | 1 | 0 | 1 | 1 | 1 | 0 | 1 | 1 | 0 | 0 | 1 | 0 | 0 | 1 | 0 |
| 9 | 1 | 1 | 1 | 0 | 1 | 1 | 0 | 1 | 1 | 0 | 0 | 1 | 0 | 1 | 0 | 0 |
| 0 | 1 | 1 | 1 | 0 | 1 | 0 | 1 | 1 | 1 | 0 | 0 | 0 | 1 | 1 | 0 | 0 |
| I | 1 | 0 | 1 | 1 | 1 | 1 | 1 | 0 | 1 | 0 | 1 | 0 | 0 | 0 | 0 | 1 |
| II | 1 | 0 | 1 | 1 | 1 | 1 | 0 | 1 | 1 | 0 | 0 | 1 | 0 | 0 | 0 | 1 |
| III | 1 | 0 | 1 | 1 | 1 | 0 | 1 | 1 | 1 | 0 | 0 | 0 | 1 | 0 | 0 | 1 |
| IV | 1 | 0 | 1 | 1 | 0 | 1 | 1 | 1 | 1 | 0 | 0 | 0 | 0 | 1 | 0 | 1 |
| V | 1 | 0 | 1 | 0 | 1 | 1 | 1 | 1 | 1 | 0 | 0 | 0 | 0 | 0 | 1 | 1 |

70 72

INVENTOR.
Angelo Vaccaro
BY
Johnson and Kline
ATTORNEYS

Dec. 15, 1970 A. VACCARO 3,548,374

CHARACTER RECOGNITION SYSTEM

Filed Aug. 30, 1966 3 Sheets-Sheet 3

INVENTOR.
Angelo Vaccaro
BY
Johnson and Kline
ATTORNEYS 3,548,374

CHARACTER RECOGNITION SYSTEM

Angelo Vaccaro, Port Washington, N.Y., assignor to Columbia Ribbon and Carbon Manufacturing Co., Inc., Glen Cove, N.Y., a corporation of New York Filed Aug. 30, 1966, Ser. No. 576,156
Int. Cl. G06k 9/18
U.S. Cl. 340—146.3 6 Claims

ABSTRACT OF THE DISCLOSURE

A system for automatically reading characters and for producing an electrical representation unique to each character read in which the reading of the character produces a voltage wave having positive and negative spikes. A two state means is caused to assume one state by a one polarity spike and to retain the one state until shifted to its other state by an opposite polarity spike, which state it retains until shifted to its one state by the occurrence of a one polarity spike. The characters are formed of vertical strokes with coded different length intervals therebetween and the state of the two means is sequentially stored with each trigger pulse. Two pulses are produced each time a stroke is sensed, with one pulse normally causing storage of the state of the two state means and the other causing storage only when a long interval exists between strokes.

In my copending application Ser. No. 496,333, assigned to the assignee of the present invention, there is disclosed an automatic character reading system for machine language characters having the shape approved by the American Bankers Association (ABA). While ABA characters have come into relatively widespread use, another code of machine language characters known as CMC7 has been approved and is being used by other associations desirous of having commonly configurated characters for automatic reading. The two codes differ substantially from each other in appearance though each is capable of being visually as well as automatically read. However, by reason of their substantial differences the specific system for automatically reading ABA code characters as disclosed in the above-noted application is incapable of reading the CMC7 code characters.

The configuration of each CMC7 character is required to have approved dimensions within small tolerances and the ink if containing magnetic particles is also required to have at least minimum characteristics. The criticalness of the characteristics of the characters has been caused by the capabilities of heretofore known automatic reading systems to enable said system to automatically read a character with a minimum possibility of error. As a character may depart from its approved characteristics, it has and could be inaccurately automatically read thereby introducing error into subsequent equipment using the automatically read knowledge.

It is accordingly an object of the present invention to provide an automatic recognition system for characters of the CMC7 code which provides a different electrical signal for each of the characters of the code with the signal being representative of the character read.

Another object of the present invention is to provide an automatic character recognition system that is capable of automatically reading, without error, characters which substantially depart in characteristics from heretofore approved configurations and specifications.

A further object of the present invention is to provide an automatic character recognition system that is capable of automatically reading, without error, magnetic characters which have been formed with ink that vary over a wide range of content of magnetic material and which also may be used to optically recognize such characters whether or not they are formed with magnetic material in the ink.

Still another object of the present invention is to provide a character recognition system that achieves the above objects and which is relatively rapid in reading characters, extremely economical in construction, durable in use and comparatively trouble-free.

The character reading system of the present invention has particular utility when employed to provide an electrical signal representative of a character read when the character is formed in a manner that conforms to the specifications for a CMC7 code character. The code is based on forming each character with seven vertical strokes with each having the same specific width but in which any stroke may be broken into vertical segments. The height of a character may vary over a wide range but most strokes in a character will generally have a common height. As there are seven strokes in each character, six intervals are thus formed with an interval occurring between each stroke. For enabling automatic reading of each character the code calls for each character to be formed with the intervals having two different size widths. The short intervals has a width equal to twice the width of a stroke while a long interval has a width that is 1⅔ times the width of the short interval.

In the numerical CMC7 system having fifteen characters, each character is formed with no more than two long intervals with the remainder being short intervals thus giving fifteen possible binary representations. The CMC7 code also has an alphabetic part in which each character is formed with no more than three long intervals, thus providing twenty-six possible binary representations.

In the CMC7 code, the short and long intervals and their positions in a character correspond to the binary representation for the character. The short intervals are represented in the binary code by the digit 0 while the digit 1 represents the long intervals. With each interval in the character being represented in the binary code by either a digit 0 or a digit 1, each binary code representation of a character will have six digits. By varying the positions of the intervals in the shape of each character, the binary code representation is accordingly also varied so that each character has a different binary code representation and a different spacing of the intervals.

In accordance with the present invention, each character is initially passed beneath a sensing head which produces a voltage wave representative of the character. The sensing head, whether magnetic or optical, is designed to scan only a small horizontal slit of the character as it is passed therebeneath and preferably the sensing head scans the complete height thereof. The passing of a character beneath the sensing head produces a voltage wave that includes voltage spikes representative of the two conditions of the part of the character being scanned, namely the beginning and end of a stroke or the presence or absence of a stroke. With a magnetic sensing head, a spike of one polarity is produced when the slit senses an increase in the quantity of magnetic powder and a spike of the other polarity is produced when the slit senses a decrease in the quantity of magnetic powder. Thus one stroke, when sensed, has its initial edge produce a positive spike which gradually decays or may remain stationary in value and its trailing edge produce a negative spike. In the optical system effectively the same type of voltage wave is produced by the sensing of a change from light to dark and dark to light.

The present system uses the spikes to cause a two state means, such as a flip-flop, to achieve one state for a positive spike and its opposite state for a negative spike. Thus, as a stroke is read, the flip-flop is caused to assume its one state by reason of the initial edge positive spike and it maintains this state until the trailing edge is read when it is caused to assume its opposite state. The system uses each positive spike to produce a trigger pulse at a time that is preferable when substantially the midpoint of the stroke that produced the positive spike is being read. The trigger pulse triggers a plural stage shift register to store the state of the flip-flop. As there are seven strokes, seven states of the flip-flop are stored.

The shift register is also caused to store the state of the flip-flop whenever an additional trigger pulse is applied to it. The additional trigger pulse is activated by the initial edge of a stroke but its appearance is delayed for the length of time required for its activating stroke, a short interval and a portion of a subsequent stroke to pass beneath the tape head. Thus whenever there is a short interval between two successive strokes, the additional trigger pulse is timed to occur after the flip-flop has had its state changed to its stroke indicating state by the sensing of the initial edge of the subsequent stroke. However, when a long interval appears between successive strokes, the additional trigger pulse will appear prior to the sensing of the initial edge of the subsequent stroke. The additional trigger pulse is prevented from triggering the shift register whenever a short interval appears between successive strokes but triggers the shift register when a long interval appears and thus only effects storing the condition of the flip-flop for each long interval.

The shift register stores for each character read having two long intervals, 10 states of the flip-flop. Three of the states are common to all characters and are disregarded while the remaining seven have a different binary representation for each different character.

To render the unique representation of each character compatible with equipment designed to utilize either the CMC7 binary code designation or a decimal designation of a character, the system preferably includes a decoder. The decoder translates the stored seven digit representation of the character in the shift register into approved binary code or decimal representation. It will be understood that, if desired, the unique code of the character in the shift register may be employed directly.

Other features and advantages will hereinafter appear.

Figure 1:
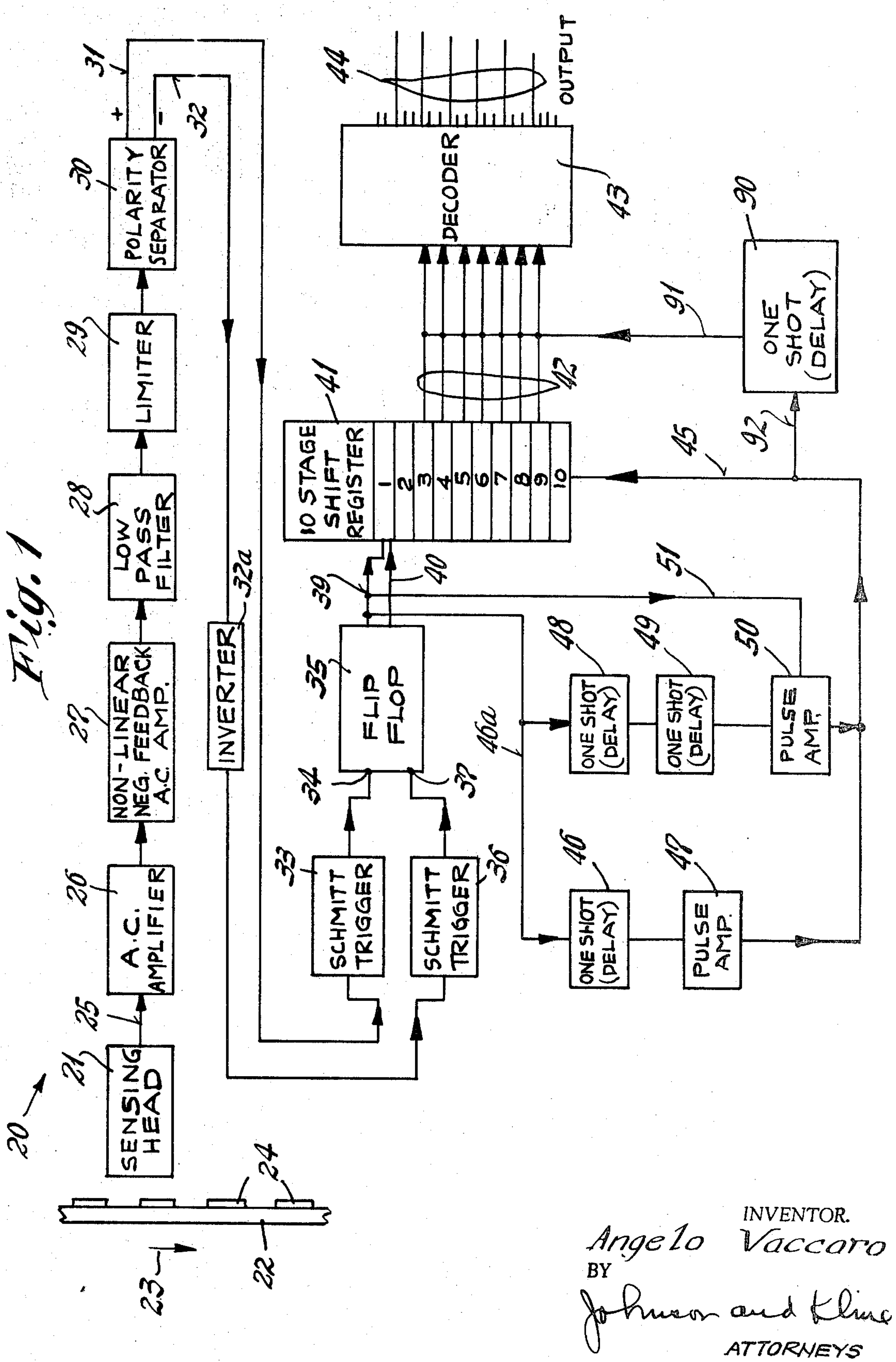
FIG. 1 is a block diagram of the system.

Referring to the drawing, FIG. 1, the character reading system of the present invention is generally indicated by the reference numeral 20 and includes a sensing head 21. A sheet or card 22 is moved in the direction indicated by the arrow 23 so that CMC7 characters 24 formed thereon by printing or pressure impression will pass beneath the sensing head 21. The sensing head, which may be either an optical slit scanner or a magnetic tape head, scans a vertical slit of the character as it is moved therebeneath and change in the quantity of ink and/or magnetic material in the ink will produce a voltage wave in the lead 25.

Each character of the code by reason of its different shape will produce a voltage wave unique to it with the wave having positive and negative spikes. The wave is amplified by an A.C. amplifier 26 and a nonlinear negative feedback amplifier 27 and then filtered by a low pass filter 28 which filters unwanted voltages, such as noise. A limiter 29 is employed to decrease the amplitude of all spikes of the voltage wave to substantially the same value. The spikes are then led to a polarity separator 30 having a pair of output leads 31 and 32 with the positive spikes of the voltage wave appearing on the lead 31 and the negative pulses on the lead 32. The lead 31 is connected to a Schmitt trigger 33 whose output is connected to a trigger point 34 of a flip-flop 35. The lead 32 is connected through a polarity inverter **32*a* to another Schmitt trigger 36 whose output is connected to the other trigger point 37 of the flip-flop 35**.

With the above-described components, the flip-flop 35 will be caused to have one state when a positive spike is created by the sensing head and will be caused to have its other state when a negative spike is created. The flip-flop 35 is preferably of the bistable type and thus will retain its state until it is changed by a spike which causes it to have its other state.

The flip-flop 35 has a pair of output sense points to which leads 39 and 40 are connected and these leads terminate in the entrance stage of a 10-stage shift register 41. The shift register has output leads 42, specifically only seven in number. The leads 42, as shown in the specific embodiment herein described, are connected to a decoder 43 having output leads 44 which may be six in number as shown if a binary representation of a character is desired or may be 15 in number if a decimal representation is desired or may be 21 in number if both kinds of representation are desired. The leads 44 will have a voltage thereon which represents in either or both conventional binary code or decimal code the character that has passed under the sensing head and accordingly constitutes the output of the system to which subsequent information utilizing equipment requiring such representation may be connected.

The shift register 41 is continually connected to the sense points of the flip-flop 35 and to effect storage of the state of the flip-flop 35, a lead 45 is connected to the shift register to carry trigger pulses to all stages of the shift register to cause them to shift. The lead 45 may receive a trigger pulse from either a one-shot delay (monostable multivibrator) 46 and pulse amplifier 47 or from a one-shot delay 48 connected to another one-shot delay 49 and pulse amplifier 50. The one-shot delay 46 functions to supply a trigger pulse whenever the initial edge of a stroke is sensed, and the flip-flop 35 has assumed a state representative thereof by the sense point connected to the lead 39 changing from negative to zero. A lead **46*a* connected to the lead 39 and the one-shot delay 46 serves, when the voltage of the lead 39 changes from negative to zero, to actuate the one-shot delay 46 causing it to deliver a pulse a set time after receipt of the voltage change. The one-shot delay 46 delivers a trigger pulse through the pulse amplifier 47 to shift register 41 whenever the initial edge of each stroke is sensed. The time lapse introduced by the one-shot delay 46 is preferably set to cause the trigger pulse to the shift register to occur when the middle of the stroke is under the sensing head and as such is generally about one-half the time required for a stroke to pass beneath the sensing head. It is thus a function of the width of the stroke and the speed of movement of the sheet 22**.

The one-shot delay 48 is also connected to the lead **46*a* and is similarly actuated by the lead 39 going from negative to zero voltage and serves to produce a pulse a definite time after receipt of the voltage change. This latter pulse serves to actuate a second one-shot delay 49 which in turn, after a predetermined time, supplies a pulse to the pulse amplifier 50. The time lapse between the voltage change in the lead 39 and the application of the pulse to the pulse amplifier 50** is the sum of the time delay created in the one-shot 48 and the delay created in the one-shot delay 49.

The pulse amplifier 50 has a connection to a lead 51 that is connected to the lead 39, the one sense point of the flip-flop 35. A zero voltage on the lead 51 serves to inhibit the amplifier 50 and prevent it from delivering a pulse received from the one-shot delay 49 to the trigger lead 45. The lead 51 is zero after a positive spike has changed the flip-flop to the 1 state, as by the sensing of the initial edge of a stroke, and thus the amplifier 50 is prevented from delivering a trigger pulse to the shift register whenever the flip-flop 35 is in its 1 state. Whenever the flip-flop 35 is in its other or 0 state, which occurs during the scanning of an interval, the pulse amplifier 50 does not inhibit the passing of a trigger pulse to the shift register.

The one-shot delays 48 and 49 have a total time lapse that is greater than the time to scan one stroke and one short interval but less than the time to scan one sroke and one long interval. Thus when two strokes are separated by a short interval, the pulse produced from the one-shot delay 49 will occur when the second stroke is being scanned but said pulse is not passed by the pulse amplifier 50. When two strokes are separated by a long interval (which is 1.6 times a short interval) the same total time lapse will cause a trigger pulse to appear when the trailing half of the long interval is being scanned. As the flip-flop will be in its 0 state, the pulse amplifier will not be inhibited and hence the pulse will pass to the trigger pulse lead 45.

The time lapse introduced by the on-shot delay 48 is preferably the time required to scan a stroke and one-half of a short interval while the one-shot delay 49 is set to provide a time lapse essentially equal to the time required to scan the other half of a short interval and one-half of a stroke. The additional trigger pulse will accordingly occur at approximately the midpoint of the trailing half of a long interval. Also with such a division of the total time lapse, the one-shot delay 48 has delivered its pulse and is in condition to accept a change in the lead 46*a* when the next stroke is scanned even when separated by a short interval.

As an example of the time delays, if the dimension of a width of a stroke is 0.15 mm., the width of a short interval is 0.30 mm. and the width of a long interval is 0.50 mm. and the speed of the card beneath the sensing head is 0.01 mm. per millisecond, then the one-shot delay 46 will have a time lapse of approximately 7.5 milliseconds (one-half a stroke); the one-shot delay 48, a time lapse of approximately 30 milliseconds (one stroke plus one-half of a short interval); and the one-shot delay 49 a time lapse of 22½ milliseconds (one-half a short interval plus one-half a stroke).

It has been found preferable to have the pulses caused to occur at the various midpoints of the strokes and intervals to enable characters having dimensions with the widest possible tolerances to be accurately read. It will be understood however that the pulses do not necessarily have to occur at the various midpoints so long as they occur at a time that produces the same results.

Figures 2, 6, 7:
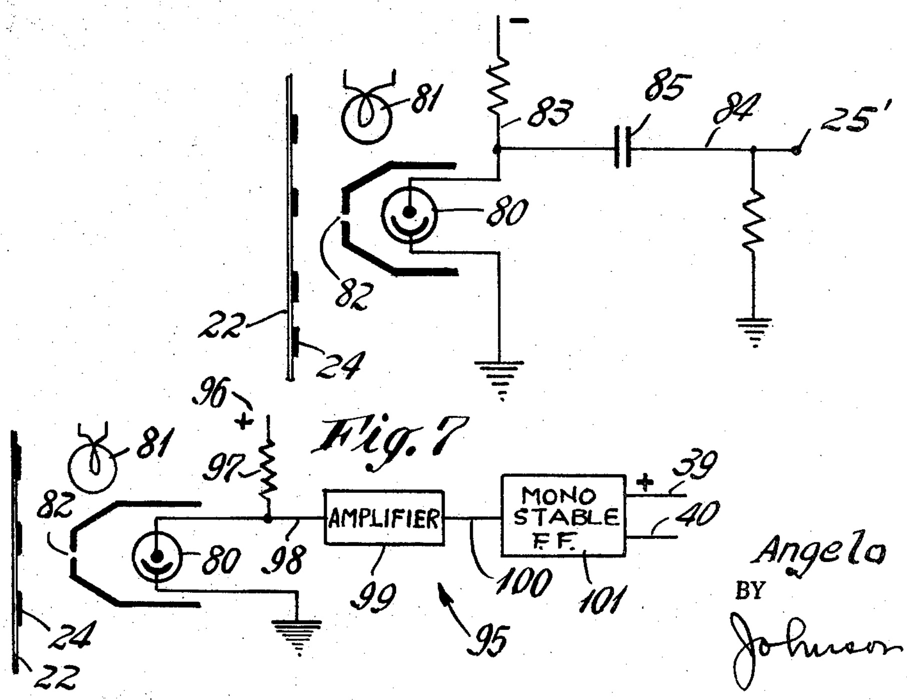
FIG. 2 is a chart of each character in the CMC7 numerical code with the binary representation thereof in both the unique code of the present system and the approved binary code.
FIG. 6 is a diagrammatic illustration including an electrical schematic diagram of a sensing head for optically reading characters.
FIG. 7 is an electrical schematic diagram of another optical reading system.
Figure 3:
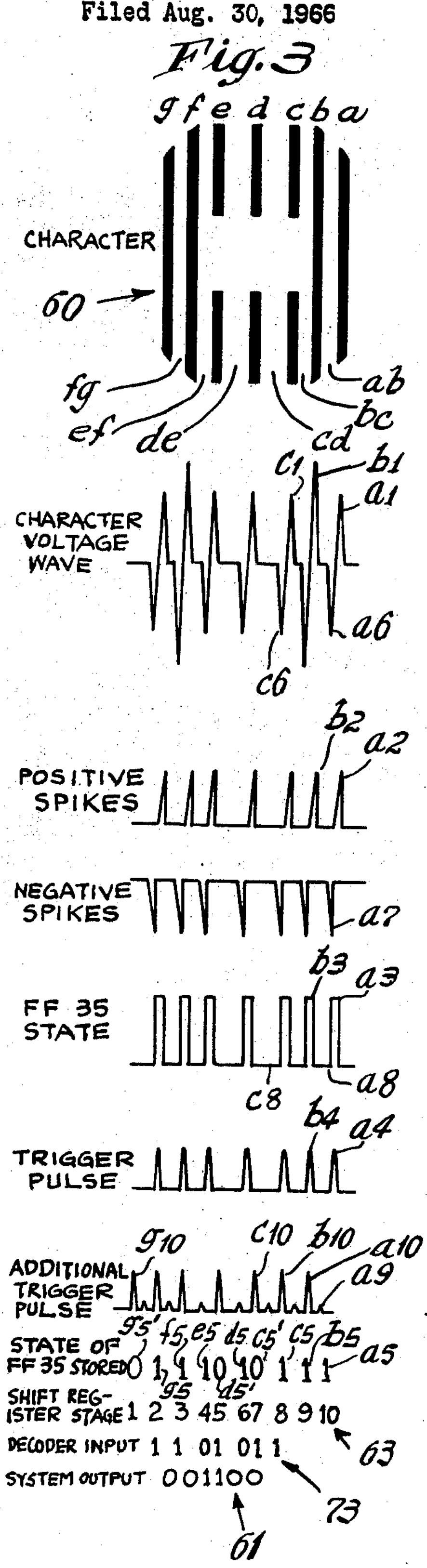
FIG. 3 is an illustration of the CMC7 numeral 0 with voltage waves and conditions that occur in different parts of the system as the numeral is being and has been read.

The CMC7 character 0 is indicated by the reference numeral 60 in FIG. 3. The character is formed with seven vertical strokes denoted *a, b, c, d, e, f, g* which defines therebetween intervals *ab, bc, cd, de, ef,* and *fg* respectively. The intervals *ab, bc, ef* and *fg* are short intervals while the intervals *cd* and *de* are long intervals. The particular location of the long and short intervals corresponds to the binary representation in conventional code of the character with the long interval being represented by the binary digit 1 while the short interval is represented by the binary digit 0. The character is read from left to right and accordingly the binary representation of the character 0 is 001100 as appears on the chart, FIG. 2, and which is indicated by the reference numeral 61 in FIG. 3. This representation will appear on the output leads 44 of the decoder 43 whenever the character 0 has been read.

With the character 0 being on the sheet 22 and moving in the direction indicated by the arrow 23, the sensing head will read the character from right to left and thus the right-hand or initial edge of the stroke *a* will be first sensed by the sensing head 21. This produces a positive voltage spike *a*1 in the lead 25 which after amplification by the amplifiers 26 and 27 and limited by the limiter 29 appears on the lead 31 as a positive spike *a*2. The spike *a*2 then causes the Schmitt trigger 33 to produce a signal in the lead 34 which causes the flip-flop 35 to achieve its one state indicated by the reference character *a*3. When the flip-flop assumes its one state, the signal through the lead 46*a* activates the one-shot delay 46 to supply a pulse *a*4 on the lead 45 to the shift register. The shift register then stores the state of the flip-flop in its entrance or first stage. This is represented by the binary digit 1 and indicated by the reference character *a*5.

In FIG. 3 the various conditions that occur in the system are depicted vertically aligned with the parts of the character that is being scanned when the condition exists. Thus the spikes *a*1 and *a*2 and flip-flop 35 state *a*3 are substantially vertically aligned with the initial edge of the stroke *a* since they occur substantially simultaneously. The trigger pulse *a*4 and the storage of the state *a*5 of flip-flop 35 each occurs substantially when the midpoint of the stroke *a* is being scanned and thus are vertically aligned therewith. The shift register stages 1–10 inclusive are vertically aligned with the state of the flip-flop 35 which they will store when the character has been completely read. Thus the state *a*5 will become stored in stage 10 of the shift register even though it is initially introduced in the entrance stage.

Upon the initial edge of the short interval *ab* being scanned, a negative voltage spike *a*6 occurs in the voltage wave which produces negative spike *a*7 and changes the state of the flip-flop 35 to the 0 state as indicated by the reference character *a*8. When the initial half of the short interval *ab* has passed, the one-shot delay 48 delivers a pulse *a*9 to the one-shot delay 49. As a trigger pulse is not supplied during the scanning of the short interval, the 0 state of the flip-flop 35 is not stored.

The initial edge of the stroke *b* is then sensed producing positive voltage spikes *b*1 and *b*2, changing the state of flip-flops 35 to the 1 state, *b*3, which after a short delay produces the trigger pulse *b*4. The 1 state of flip-flop 35 is then stored, as indicated by the reference character *b*5, in the shift register.

At substantially the same time as the trigger pulse *b*4 is produced, the one-shot delay 49 delivers a trigger pulse *a*10 to its pulse amplifier 50. However, as the flip-flop 35 is in its 1 state with the lead 39 being zero, the passing of the pulse to the shift register is inhibited.

The initial edge of the short interval *bc* then produces a negative voltage spike which causes the same effects and condition as the spike *a*6.

The initial edge of the stroke *c* will produce a positive spike *c*1 causing the same conditions to occur as the initial edges of the strokes *a* and *b*. Also the additional trigger pulse *b*10 will occur midway in the scanning of stroke *c* but will be inhibited by the 1 state of the flip-flop 35.

After the stroke *c* has passed, a negative spike *c*6 will occur at the beginning of the long interval *cd*. The spike *c*6 will produce the same conditions as the negative spike *a*6. As it is a long interval, the 0 state *c*8 of the flip-flop 35 will be longer and the pulse *c*10 will occur midway in the latter half of the interval *cd*. Since the flip-flop 35 is in the 0 state, the pulse amplifier 50 is not inhibited and the trigger pulse *c*10 will cause the 0 state *c*5′ of the flip-flop 35 to be stored in stage 7 of the shift register.

The initial edge of the stroke *d* is subsequently sensed, producing the same effects and conditions as with the sensing of the initial edge of the previous strokes *a*, *b* and *c*, and the storing of the 1 condition *d*5 in stage 6 of the shift register. As the interval *de* is a long interval, there is also stored the 0 state *d*5' of the flip-flop 35 in stage 5 of the shift register. Subsequently the strokes *e*, *f* and *g* are sensed producing the storage of the states *e*5, *f*5 and *g*5. The gap after the trailing edge of the stroke *g* is stored as *g*5' by the additional trigger pulse *g*10 occurring in the gap between the 0 character (the character that has just been scanned) and a subsequent character to be scanned. There is accordingly stored in the shift register the binary representation of the states of the flip-flop 35 from the entrance stage to stage 10, the states 0111010111.

Figure 4:
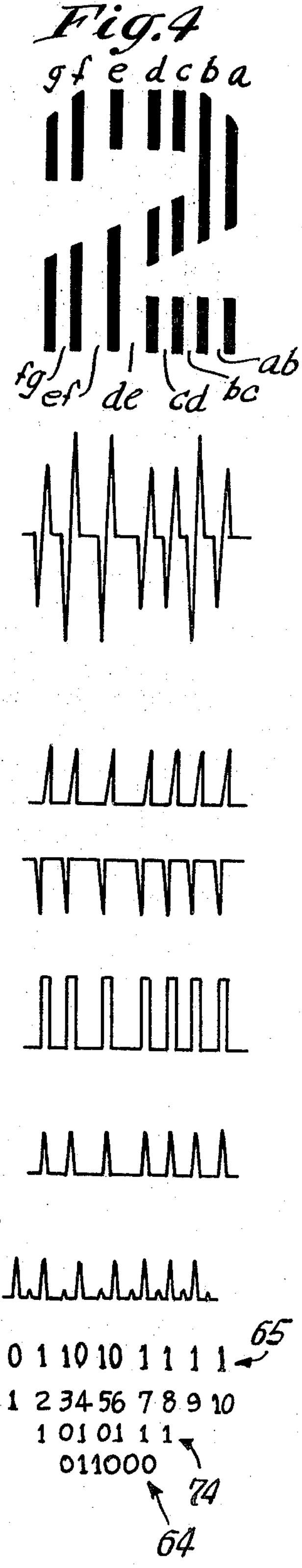
FIG. 4 is an illustration similar to FIG. 3 for the CMC7 numeral 2.

Another example of the operation of the system of the present invention is depicted in FIG. 4 for the CMC7 character 2 wherein there are shown the states and conditions of the various parts of the system. It will be appreciated that the character 2 has seven strokes *a*, *b*, *c*, *d*, *e*, *f* and *g* together with six intervals *ab*, *bc*, *ce*, *de*, *ef* and *fg*. The intervals *de* and *ef* are long intervals with the remainder being short intervals and the conventional binary representation of the character 2 is 011000 (indicated by the reference numeral 64). The shift register stores a 1 state for each stroke and a 0 state for each long interval (and the gap after the character) and thus the character 2 will have the binary representation of 0110101111 (indicated by the reference numeral 65) in the unique code of the present system.

In FIG. 4 the various states and conditions that occur are depicted as they occur simultaneously vertically aligned with the part of the character being scanned. As the character is "read" from right to left, the time duration extends from right to left with a condition appearing leftwardly of another condition occurring later in time. Also, the various conditions are horizontally aligned with the same conditions described in connection with FIG. 2.

Figure 5:
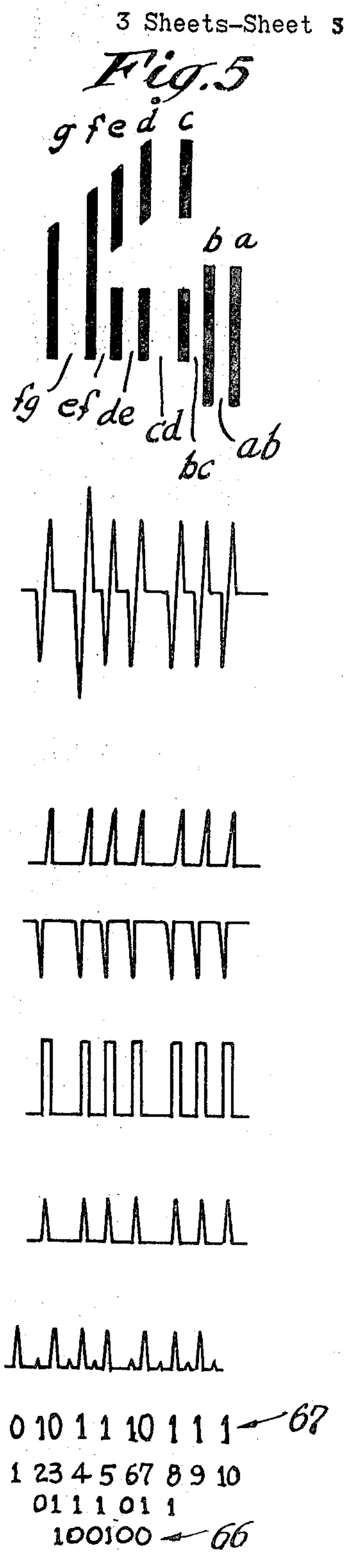
FIG. 5 is an illustration similar to FIG. 3 for the CMC7 numeral 4.

In FIG. 5, which is similar to FIGS. 3 and 4, the CMC7 character 4 is shown together with the states and conditions occurring in the system. The character 4 has the usual seven strokes *a*, *b*, *c*, *d*, *e*, *f* and *g* and intervals *ab*, *bc*, *cd*, *de*, *ef* and *fg*. The intervals *cd* and *fg* are long intervals and the binary representation in conventional code of the character is accordingly 100100 as indicated by the reference numeral 66. The various conditions that occur as this character is read are shown and are produced in the manner explained with respect to the other two characters. Each stroke will produce a 1 state of the flip-flop 35 and be stored in the shift register while each long interval will produce the storage of a 0 state. The storage register will have the states of the flip-flop 35, 0101110111 inversely sequentially stored therein, such states being indicated by the reference numeral 67.

Referring to FIG. 2, there is set forth the CMC7 numerical code of Arabic numbers 1 through 0 and Roman numerals I through V with the vertical column thereof being indicated by the reference numeral 70. Horizontally aligned with each number and numeral is the binary state of each of the shift register stages which the reading of the character will produce. This chart is designated "system code." In the chart, the character 1 for example will have shift register stages 10, 9, 7, 6, 5, 4 and 1 in the 1 state while the stages 8, 3 and 1 will be in the 0 state. Also, horizontally aligned with the character 1 is the approved binary representation of the CMC7 code that corresponds to the disposition of the long and short intervals in the character with the "approved code" being indicated by the reference numeral 72.

In the system code chart, all the characters of the code will cause stage 1 of the shift register to have a 0 state which is physically caused by the existence of the usual gap between adjacent characters and the storage thereof by the trigger pulse *g*10. Stage 2 of the shift register for all characters has the 1 state caused by the sensing of the initial edge of the last stroke *g*. Similarly stage 10 of the shift register will have for each character the 1 state caused by the initial edge of the stroke *a*. As these three stages each contains for every character the same state, they are not helpful in providing a unique representation of the character read and are preferably disregarded. The system code which may constitute the output of the system or be translated into conventional code by the decoder 43 is thus only the states stored in the other stages. The system code accordingly requires only seven necessary binary digits which constitute the output of the shift register 41. For the CMC7 character 0, for example, the binary representation is 1101011. Other examples of the system code which are shown in FIG. 2 are 1010111 for the CMC7 character 2; 0111011 for the CMC7 character 5, etc.

It will be understood from the chart of the system code in FIG. 2 that each character in the stages 3 through 9 is represented by a different binary code unique to the system of the present invention. The code may be used directly into subsequent equipment designed to utilize said code or it may be introduced into the decoder 43 which converts the unique code of the present system to a conventional binary code for the character in the CMC7 system or may produce in the output leads 44 a decimal representative of the code. A decoder for translating one code into another may be easily constructed by those skilled in the art and accordingly is not specifically herein disclosed.

As heretofore mentioned, the sensing head 21 may be either a tape head for sensing characters 24 formed with ink having magnetic particles or may be an optical system scanning characters that are formed with visually perceptible ink with or without magnetic particles. In FIG. 6, an optical sensing circuit is shown with the card 22 having a character 24 formed thereon. The optical system includes a photocell 80 that is positioned to receive light reflected from a bulb 81 through a slit 82, the latter having a relatively small width such as only a few thousandths of an inch, and preferably a length that is at least equal to the height of a character. The photocell 80 will change its resistance with the sensing of the initial edge of a stroke by the stroke being formed of dark ink on the light colored sheet 22 and cause a lead 83 to increase its negative potential. A lead 84 is connected to the other side of a condenser 85 to which the lead 83 is connected and will have a positive spike induced therein by the change in negative voltage on the lead 83. The lead 84 terminates in a terminal 25'. The optical sensing circuit may be connected in the system 20 by the lead 25 being connected to the terminal 25'. With such a construction the optical sensing circuit will produce essentially the same waves as a tape head in that positive spikes will occur with a change from light to dark and/or an increase in magnetic particle content and negative spikes with the change from dark to light and/or a decrease in magnetic particle content.

It has been found that one specific one-shot delay circuit which may be employed in the present system for the one-shot delays 46, 48 and 49 is designated as R–302 and available from Digital Equipment Corp., Maynard, Mass. Also available from the same company are pulse amplifiers designated R–603 which may be used for the pulse amplifiers 47 and 50.

In FIG. 7 there is shown a further embodiment of an optical scanning system. With this embodiment, the maintenance of the condition of a two state means is also made responsive to the part of the character read. However, rather than have a bistable flip-flop, a monostable flip-flop is employed and caused to assume its 1 state whenever a photocell has a high resistance and revert to a 0 state when the resistance is lowered. The high resistance occurs with the scanning of the initial edge of a stroke and is maintained while the stroke is scanned. The low resistance occurs with and during the scanning of a gap. Voltage changes or spikes produced by the change in resistance of the photocell occur at the same time as the spikes in the previous embodiment. But as the voltage representation of the portion of the character being scanned is maintained, one of such maintained voltages may thus be employed to hold the other state of a monostable flip-flop and the other voltage used to enable the flip-flop to return to its normal state. Naturally, if desired, a bistable may be employed with appropriate inverters to cause the correct voltage changes to be applied to the trigger points of the flip-flop.

The circuit 95 of FIG. 7 includes a photocell 80, light source 81, sheet 22 bearing characters 24 and slit 82. The photocell 80 is connected to a positive source 96 through a resistance 97. The photocell will produce a high positive voltage on a lead 98 when a stroke is scanned and a low positive voltage when an interval is being scanned. The lead 93 is connected to an amplifier 99 which has an output lead 100 connected to the trigger point of a monostable flip-flop 101. A pair of leads 39 and 40 are connected to the sense points of the flip-flop 96 and correspond to same leads 39 and 40 respectively of the other circuits. The amplifier 99 amplifies the high positive voltage to produce on the lead 100 a voltage having a value capable of causing the monostable flip-flop 101 to assume its other state and maintain it at such a state until the voltage decreases. It however will not amplify a low voltage on the lead 98 to a value on the lead 100 which is sufficient to cause the flip-flop 101 to assume its other state.

The normal state of the flip-flop 101 is the 0 state with lead 40 being negative and lead 39, 0. Whenever a low voltage appears on the lead 98 it will have this state and if a trigger pulse is applied to the shift register, this state will be stored. Whenever a high voltage appears on the lead 98 caused by and maintained during the scanning of a stroke, the flip-flop 96 will have a 1 state and if a trigger pulse occurs, this state will be stored. The circuit shown in FIG. 7 will accordingly produce the same states at the same time in the reading of a character as the previously disclosed embodiments of the invention.

It will be appreciated from the above the manner in which the system of the present invention automatically reads one character. With this character information stored in the shift register, it may be subsequently caused to be fed out on output leads 42 and/or 44 at the completion of the reading of a character. In the embodiment shown, where it is desired to feed out the information at the completion of the scanning of a character and prior to the reading of a subsequent character, there is provided a one-shot delay 90 having an output lead 91 connected to the various leads 42 to apply a voltage thereto which blocks transmission of information on these leads until the voltage is removed. It desired, rather than a voltage, gates may be employed. The one-shot delay 90 applies the blocking voltage for a length of time required for a character to pass beneath the sensing head and is actuated by a lead 92 connected to the lead 45.

Each character requires a definite time to be read determined by its width and its speed beneath the sensing head and the delay maintains the blocking voltage for the widest width character. Upon reaching the end of its time, it will stop inhibiting transfer of information on the leads 42 by removal of the blocking voltage on the lead 91. When the next character has begun to be read, the first trigger pulse will cause the one-shot delay to assume its condition which will again cause a blocking voltage to be applied to the leads 42. If desired the voltage in the lead 91 may also be used to set the shift register 41 to have a common state for each of the stages. However, such has not been found necessary as the shift register automatically clears itself during the reading of a subsequent character.

In the specific embodiment of the invention shown, the selected states of the flip-flop 35 have been stored in a plural stage shift register. It will be understood that other and different devices for sequentially storing the states, such as for example a tape perforator, may be used and caused to be actuated by each trigger pulse. Moreover, while the system is specifically disclosed as capable of reading CMC7 characters, it may also be employed to read codes which consist of strokes and different length intervals even when they are shaped so as not to be visually recognizable as common numbers or letters.

It will accordingly be understood that there has been disclosed an automatic character reading system for reading characters which are composed of vertical strokes separated by intervals of different lengths. The system has a two state means that is caused to assume one state while a stroke is being scanned and its other state during the scanning of an interval. Its state for each stroke is stored and its state for one of the two lengths of different length intervals is also stored with the storage being sequential as the character is being read.

As every character has a different disposition of its different intervals, each storage will accordingly consist of a binary representation of the character read with each character having a different binary representation. The representation is unique to the present system and may if desired be used directly in subsequent information processing machinery or decoded into conventional binary or decimal representation for subsequent use.

Variations and modifications may be made within the scope of the claims and portions of the improvements may be used without others.

I claim:

1. A system for automatically reading characters of the type that are at least partially formed with a plurality of vertical strokes with either long or short size intervals existing between the strokes and producing an electrical representation corresponding to the identity of each character read comprising a sensing means beneath which a character is adapted to be passed and which produces a signal having a first condition caused by the scanning of a stroke and a second condition caused by the scanning of an interval, two state means connected to be actuated by the signal from the sensing means and being caused to assume a first state for a signal of the first condition and a second state for a signal of the second condition and for retaining the state to which it was last shifted until a signal of the other condition occurs to shift it to its other state, means for sequentially storing instantaneous states of the two state means to form a binary representation of the character read in a unique code and in which there are means connected to the two state means to be responsive to its state and operative to prevent the storing of one of the states when one of the two sizes of intervals exists between successive strokes by the two state means being in its one staate as it scans the successive stroke and to cause storing of the other state when the other size of the two sizes of intervals exists between successive strokes by the two state means being in its other state as it scans the other interval between the successive stroke.

2. The invention as defined in claim 1 in which the storing means consists of a shift register having an entrance stage and a plurality of subsequent stages, means connecting the two state means to the entrance stage to store the first state of the two state means for at least all intermediate strokes of the character while scanning each stroke and store the second state of the two state means ony during a long interval, and in which there is at least one stage for each first state stored and for each second state stored.

3. The invention as defined in claim 1 in which the storing means stores the state of the two state means upon receipt of a trigger pulse and there are additional trigger pulse means operative to provide an additional trigger pulse upon the two state means assuming its first state by the scanning of a stroke and for delaying said additional trigger pulse for a length of time that is at least more than the time for the stroke and a short interval to pass beneath the sensing means, in which the additional trigger pulse means includes a first and a second time delay means and means serially connecting said two time delay means, said first time delay means delaying said trigger pulse for a length of time less than the time for the stroke and a short interval to pass beneath the sensing means and said second time delay means delaying said trigger pulse for the length of time for at least a stroke to pass beneath the sensing head and in which there are means in the additional trigger pulse means connected to the two state means for preventing the applying of the additional trigger pulse means to the storing means if the two state means is in its first state when the additional trigger pulse appears.

4. A system for automatically reading characters of the type that are at least partially formed with a plurality of strokes with either long or short intervals existing between the strokes and producing an electrical representation corresponding to the identity of each character read comprising a sensing means beneath which a character is adapted to be passed and which produces a signal having a first condition caused by the sensing of a stroke and a second condition caused by the sensing of an interval, two state means connected to be actuated by the signal from the sensing means and being caused to assume a first state for a signal of the first condition and a second state for a signal of the second condition, a plural stage storage means, means connecting the two state means to the storage means, means in said storage means for causing the storage means to store the instantaneous state of the two state means upon receipt of a trigger pulse, means for supplying a trigger pulse when the two state means is in its first condition as it scans each stroke, means for supplying an additional trigger pulse a length of time after the two state means assumes its first state with the time being greater than the time for a stroke and a short interval to pass beneath the sensing head but less than the time for a stroke and a long interval to pass beneath the sensing means and means for inhibiting the additional trigger pulse from being supplied to the storage means when two successive strokes are separated by a short interval, and in which the two state means consists of a flip-flop and the storage means includes a plural stage shift register having an entrance stage connected to the flip-flop and in which the inhibiting means is connected to the flip-flop to be responsive to the state thereof.

5. The invention as defined in claim 4 in which the strokes are formed of material having magnetic characteristics, the sensing means includes a tape head, the first condition is a voltage spike of one polarity, the second condition is a voltage spike of the opposite polarity and the two state means is a bistable flip-flop.

6. The invention as defined in claim 4 in which the sensing means includes a photocell for optically scanning a small vertical portion of the character, the first condition is a voltage having a high value, the second condition is a voltage having a low value, and the two state means is a monostable flip-flop.

References Cited

UNITED STATES PATENTS

| | | | |
|---|---|---|---|
| 2,961,649 | 11/1960 | Eldredge et al. | 340—146.3 |
| 3,113,298 | 12/1963 | Poland et al. | 340—146.3 |
| 3,283,303 | 11/1966 | Cerf | 340—146.3 |
| 3,286,233 | 11/1966 | Lesueur | 340—146.3 |
| 3,303,469 | 2/1967 | Perotto | 340—146.3 |
| 3,309,667 | 3/1967 | Feissel et al. | 340—146.3 |
| 3,354,432 | 11/1967 | Lamb | 340—146.3 |
| 3,391,387 | 7/1968 | Flores | 340—146.3 |
| 3,461,427 | 8/1969 | Parker | 340—146.3 |

THOMAS A. ROBINSON, Primary Examiner